(12) United States Patent
Weeks (10) Patent No.: US 8,752,092 B2
(45) Date of Patent: Jun. 10, 2014

(54) METHOD AND APPARATUS FOR PROVIDING LOW RESOLUTION IMAGES IN A BROADCAST SYSTEM

(75) Inventor: William A. Weeks, Ivyland, PA (US)

(73) Assignee: General Instrument Corporation, Horsham, PA (US)

( * ) Notice: Subject to any disclaimer, the term of this patent is extended or adjusted under 35 U.S.C. 154(b) by 538 days.

(21) Appl. No.: 12/147,831

(22) Filed: Jun. 27, 2008

(65) Prior Publication Data

US 2009/0322962 A1    Dec. 31, 2009

(51) Int. Cl.
G06F 3/00 (2006.01)
G06F 13/00 (2006.01)
H04N 5/445 (2011.01)
H04N 21/2343 (2011.01)

(52) U.S. Cl.
CPC ............... *H04N 21/23439* (2013.01)
USPC .......................................................... 725/41

(58) Field of Classification Search
CPC ................................................ H04N 21/23439
See application file for complete search history.

(56) References Cited

U.S. PATENT DOCUMENTS

| | | | |
|---|---|---|---|
| 5,361,091 A | 11/1994 | Hoarty et al. | |
| 5,421,031 A | 5/1995 | De Bey | |
| 5,528,282 A | 6/1996 | Voeten et al. | |
| 5,532,748 A | 7/1996 | Naimpally | |
| 5,600,378 A | 2/1997 | Wasilewski | |
| 5,633,683 A * | 5/1997 | Rosengren et al. | 375/240.01 |
| 5,659,539 A | 8/1997 | Porter et al. | |
| 5,682,597 A | 10/1997 | Ganek et al. | |
| 5,684,799 A | 11/1997 | Bigham et al. | |
| 5,686,965 A | 11/1997 | Auld | |
| 5,701,582 A | 12/1997 | DeBey | |
| 5,719,632 A | 2/1998 | Hoang et al. | |
| 5,724,646 A | 3/1998 | Ganek et al. | |
| 5,732,217 A | 3/1998 | Emura | |
| 5,748,229 A | 5/1998 | Stoker | |

(Continued)

FOREIGN PATENT DOCUMENTS

| EP | 1294193 A1 | 3/2003 |
|---|---|---|
| EP | 1487215 A2 | 12/2004 |

(Continued)

OTHER PUBLICATIONS

PCT Search Report & Written Opinion, RE: Application #PCT/US2009/047462 Aug. 19, 2009.

(Continued)

*Primary Examiner* — Nathan Flynn
*Assistant Examiner* — Omar S Parra
(74) *Attorney, Agent, or Firm* — Lori Anne D. Swanson (57) ABSTRACT

Low resolution information streams are combined in a broadcast carrier and broadcast along with full resolution information streams down a television broadcast network. The low resolution streams may be decoded and displayed in mosaic display with multiple images from separate low resolution streams simultaneously displayed. When a user selects a particular channel to be displayed, a low resolution stream associated with the selected channel is displayed (video and audio) while the full resolution stream is processed for display. Once the full resolution stream is available for display, it replaces the low resolution stream. The user perceives a much lower channel change time by viewing the low resolution stream during the channel change delay. The low resolution stream may also be provided directly to a portable media player (PMP) in a low resolution format required for display by the PMP.

19 Claims, 6 Drawing Sheets

(56) References Cited

U.S. PATENT DOCUMENTS

| | | |
|---|---|---|
| 5,758,258 A | 5/1998 | Shoff et al. |
| 5,864,682 A | 1/1999 | Porter et al. |
| 5,884,141 A | 3/1999 | Inoue et al. |
| 5,900,905 A | 5/1999 | Shoff et al. |
| 5,909,224 A | 6/1999 | Fung |
| 5,933,193 A | 8/1999 | Niesen |
| 5,949,410 A | 9/1999 | Fung |
| 6,014,706 A | 1/2000 | Cannon et al. |
| 6,034,731 A | 3/2000 | Hurst, Jr. |
| 6,061,399 A | 5/2000 | Lyons et al. |
| 6,101,195 A | 8/2000 | Lyons et al. |
| 6,112,226 A | 8/2000 | Weaver et al. |
| 6,118,498 A | 9/2000 | Reitmeier |
| 6,137,784 A | 10/2000 | Wallerius et al. |
| 6,138,147 A | 10/2000 | Weaver et al. |
| 6,181,334 B1 | 1/2001 | Freeman et al. |
| 6,268,856 B1 | 7/2001 | Brick et al. |
| 6,310,652 B1 | 10/2001 | Li et al. |
| 6,317,459 B1 | 11/2001 | Wang |
| 6,330,286 B1 | 12/2001 | Lyons et al. |
| 6,334,217 B1 | 12/2001 | Kim |
| 6,380,991 B1 | 4/2002 | Teichmer |
| 6,381,748 B1 | 4/2002 | Lin et al. |
| 6,392,664 B1 | 5/2002 | White et al. |
| 6,415,326 B1 | 7/2002 | Gupta et al. |
| 6,480,539 B1 | 11/2002 | Ramaswamy |
| 6,490,001 B1 | 12/2002 | Shintani et al. |
| 6,510,177 B1 | 1/2003 | De Bonet et al. |
| 6,519,011 B1 | 2/2003 | Shendar |
| 6,519,693 B1 | 2/2003 | Debey |
| 6,526,580 B2 | 2/2003 | Shimomura et al. |
| 6,535,920 B1 | 3/2003 | Parry et al. |
| 6,611,624 B1 | 8/2003 | Zhang et al. |
| 6,628,712 B1 | 9/2003 | Le Maguet |
| 6,637,031 B1 | 10/2003 | Chou |
| 6,697,356 B1 | 2/2004 | Kretschmer et al. |
| 6,711,743 B1 | 3/2004 | Hong et al. |
| 6,728,317 B1 | 4/2004 | Demos |
| 6,745,715 B1 | 6/2004 | Shen et al. |
| 6,771,644 B1 | 8/2004 | Brassil et al. |
| 6,792,047 B1 | 9/2004 | Bixby |
| 6,850,965 B2 | 2/2005 | Allen |
| 6,870,887 B2 | 3/2005 | Kauffman et al. |
| 6,985,570 B2 | 1/2006 | Hasemann |
| 7,058,721 B1 | 6/2006 | Ellison et al. |
| 7,096,481 B1 | 8/2006 | Forecast et al. |
| 7,116,714 B2 | 10/2006 | Hannuksela |
| 7,143,432 B1 | 11/2006 | Brooks et al. |
| 7,149,410 B2 | 12/2006 | Lin et al. |
| 7,164,714 B2 * | 1/2007 | Martin ............... 375/240.01 |
| 7,218,635 B2 | 5/2007 | Haddad |
| 7,298,966 B2 | 11/2007 | Nakatani et al. |
| 7,366,241 B2 | 4/2008 | Matsui |
| 7,369,610 B2 | 5/2008 | Xu et al. |
| 7,430,222 B2 | 9/2008 | Green et al. |
| 7,444,419 B2 | 10/2008 | Green |
| 7,469,365 B2 | 12/2008 | Kawahara et al. |
| 7,562,375 B2 | 7/2009 | Barrett et al. |
| 7,587,737 B2 | 9/2009 | Baldwin et al. |
| 7,636,934 B2 | 12/2009 | Baldwin et al. |
| 7,720,432 B1 | 5/2010 | Colby et al. |
| 7,788,393 B2 | 8/2010 | Pickens et al. |
| 7,885,270 B2 | 2/2011 | Frink et al. |
| 2002/0016961 A1 | 2/2002 | Goode |
| 2002/0073402 A1 | 6/2002 | Sangavarapu et al. |
| 2002/0147979 A1 | 10/2002 | Corson |
| 2002/0166119 A1 | 11/2002 | Cristofalo |
| 2002/0168012 A1 | 11/2002 | Ramaswamy |
| 2002/0184637 A1 | 12/2002 | Perlman |
| 2003/0012280 A1 | 1/2003 | Chan |
| 2003/0053476 A1 | 3/2003 | Sorenson et al. |
| 2003/0093543 A1 | 5/2003 | Cheung et al. |
| 2003/0093807 A1 | 5/2003 | Nguyen |
| 2003/0098869 A1 | 5/2003 | Arnold et al. |
| 2003/0103613 A1 | 6/2003 | Hasemann |
| 2003/0128765 A1 | 7/2003 | Yoshigahara |
| 2003/0208768 A1 | 11/2003 | Urdang et al. |
| 2004/0034863 A1 | 2/2004 | Barrett et al. |
| 2004/0034864 A1 | 2/2004 | Barrett et al. |
| 2004/0049793 A1 | 3/2004 | Chou |
| 2004/0064497 A1 | 4/2004 | Debey |
| 2004/0146205 A1 | 7/2004 | Becker et al. |
| 2004/0160974 A1 | 8/2004 | Read et al. |
| 2004/0223739 A1 | 11/2004 | Suzuki et al. |
| 2004/0231004 A1 | 11/2004 | Seo |
| 2004/0255328 A1 | 12/2004 | Baldwin et al. |
| 2005/0039219 A1 | 2/2005 | Cooper et al. |
| 2005/0055730 A1 | 3/2005 | Daniels |
| 2005/0060755 A1 | 3/2005 | Daniels |
| 2005/0060756 A1 | 3/2005 | Daniels |
| 2005/0081244 A1 | 4/2005 | Barrett et al. |
| 2005/0089035 A1 | 4/2005 | Klemets et al. |
| 2005/0097596 A1 | 5/2005 | Pedlow |
| 2005/0099869 A1 | 5/2005 | Crinon et al. |
| 2005/0120131 A1 | 6/2005 | Allen |
| 2005/0135477 A1 | 6/2005 | Zhang et al. |
| 2005/0174352 A1 | 8/2005 | Gabrani et al. |
| 2005/0190781 A1 | 9/2005 | Green et al. |
| 2005/0210145 A1 | 9/2005 | Kim et al. |
| 2005/0232587 A1 | 10/2005 | Strawn et al. |
| 2005/0254649 A1 | 11/2005 | Demos |
| 2005/0262531 A1 | 11/2005 | Varma et al. |
| 2005/0265374 A1 | 12/2005 | Pelt |
| 2006/0018379 A1 | 1/2006 | Cooper |
| 2006/0020995 A1 | 1/2006 | Opie et al. |
| 2006/0075428 A1 | 4/2006 | Farmer et al. |
| 2006/0075446 A1 | 4/2006 | Klemets et al. |
| 2006/0075449 A1 | 4/2006 | Jagadeesan et al. |
| 2006/0080724 A1 | 4/2006 | Vermeiren et al. |
| 2006/0083263 A1 | 4/2006 | Jagadeesan et al. |
| 2006/0117358 A1 | 6/2006 | Baldwin et al. |
| 2006/0117359 A1 | 6/2006 | Baldwin et al. |
| 2006/0126667 A1 | 6/2006 | Smith et al. |
| 2006/0136581 A1 | 6/2006 | Smith |
| 2006/0140276 A1 | 6/2006 | Boyce et al. |
| 2006/0143669 A1 | 6/2006 | Cohen |
| 2006/0182052 A1 | 8/2006 | Yoon et al. |
| 2006/0184973 A1 | 8/2006 | de Heer et al. |
| 2006/0218281 A1 | 9/2006 | Allen |
| 2006/0224666 A1 | 10/2006 | Allen |
| 2006/0224768 A1 | 10/2006 | Allen |
| 2006/0242240 A1 | 10/2006 | Parker et al. |
| 2006/0244936 A1 | 11/2006 | Ozawa |
| 2006/0262985 A1 | 11/2006 | Chen et al. |
| 2007/0009039 A1 | 1/2007 | Ryu |
| 2007/0040818 A1 | 2/2007 | Aoyanagi et al. |
| 2007/0107026 A1 | 5/2007 | Sherer et al. |
| 2007/0121629 A1 | 5/2007 | Cuijpers et al. |
| 2007/0126853 A1 | 6/2007 | Ridge et al. |
| 2007/0130596 A1 | 6/2007 | Wirick |
| 2007/0133609 A1 | 6/2007 | Moore et al. |
| 2007/0222728 A1 | 9/2007 | Koyama et al. |
| 2007/0230564 A1 | 10/2007 | Chen et al. |
| 2007/0266398 A1 | 11/2007 | Vandaele |
| 2007/0280298 A1 | 12/2007 | Hearn et al. |
| 2007/0280354 A1 | 12/2007 | Park et al. |
| 2008/0028275 A1 | 1/2008 | Chen et al. |
| 2008/0109557 A1 | 5/2008 | Joshi et al. |
| 2008/0120553 A1 | 5/2008 | Bergman et al. |
| 2008/0127258 A1 * | 5/2008 | Walker et al. ............... 725/39 |
| 2008/0273698 A1 | 11/2008 | Manders et al. |
| 2009/0010273 A1 | 1/2009 | Green et al. |
| 2009/0064242 A1 | 3/2009 | Cohen et al. |
| 2009/0077255 A1 | 3/2009 | Smith et al. |
| 2009/0198827 A1 | 8/2009 | Hughes |
| 2009/0228943 A1 * | 9/2009 | Ramaswamy et al. ........ 725/109 |
| 2009/0245393 A1 | 10/2009 | Stein et al. |
| 2009/0307732 A1 | 12/2009 | Cohen et al. |
| 2011/0072463 A1 * | 3/2011 | Zaslavsky et al. ............ 725/41 |

(56) References Cited

U.S. PATENT DOCUMENTS

2011/0162024 A1 6/2011 Jagadeesan et al.
2011/0221959 A1 9/2011 Ben Yehuda et al.

FOREIGN PATENT DOCUMENTS

| | | |
|---|---|---|
| EP | 1523190 A1 | 4/2005 |
| KR | 10-2006-0110104 A | 10/2006 |
| WO | 9905870 A2 | 2/1999 |
| WO | 2004114667 A1 | 12/2004 |
| WO | 2004114668 A1 | 12/2004 |
| WO | 2008044916 A2 | 4/2008 |
| WO | 2009097230 A1 | 8/2009 |
| WO | 2010014210 A1 | 2/2010 |

OTHER PUBLICATIONS

Office Action, Korean App. No. 10-2011-7001984 (English Text and Foreign Translation), Jul. 13, 2012.
American National Standard ANSI/SCTE 35 2004, "Digital Program Insertion Cueing Message for Cable," Society of Cable Telecommunications Engineers, Inc., Exton, PA, USA (www.scte.org).
Azad, S.A., et al., "A novel batched multicast patching scheme for video broadcasting with low user delay," Signal Processing and Information Technology, 2003. ISSPIT 2003. Proceedings of the 3rd IEEE International Symposium on Darmstadt, Germany, pp. 339-342 (2003).
Chiariglione, L., "Short MPEG-2 description," accessed at http://web.archive.org/web/20101010044824/http://mpeg.chiariglione.org/standards/mpeg-2/mpeg-2.htm, accessed on Dec. 20, 2012, pp. 4.
Hurst, N., and Cornog, K., "MPEG Splicing: A New Standard for Television—SMPTE312M," SMPTE Journal, vol. 107, No. 11, pp. 978-988, Society of Motion Picture and Television Engineers, Inc (1998).
Johns, W., "A Better TV Experience with Microsoft Mediaroom Instant Channel Change," Word Press Ops Vault (2010).
Oliver, M., Tutorial: The H.264 Scalable Video Codec (SVC), accessed at http://www.eetimes.com/design/ signal-processing-dsp/4017613/Tutoriai-The-H-264-Scalable-Video-Codec-SVC, accessed on Mar. 10, 2008, 2 pages.
Poon, W-F., et al. "Batching policy for video-on-demand in multicast environment," Electronics Letters, IEEE ,vol. 36, No. 15, pp. 1329-1330 (2000).
Rajah, R., "Optimizing Channel Change Time," Cisco Systems, Inc., pp. 1-22 (2008).
Schulzrinne, H., et al., "Real-Time Streaming Protocol (RTSP)," Request for Comments RFC2326, Network Working Group, pp. 1-92, The Internet Society (1998).
Wave 7 Optics, Inc., "Channel Change Speed in IPTV Systems," White Paper, dated Jun. 3, 2004.
Wee, S.J., and Vasudev, B., "Splicing MPEG Video Streams in the Compressed Domain," IEEE Workshop on Multimedia Signal Processing, pp. 225-230 (1997).
Zhu, X., et al., "Video Multicast over Wireless Mesh Networks with Scalable Video Coding (SVC)," Visual Communications and Image Processing, Proceedings of the SPIE, vol. 6822, pp. 682205-682205-8 (2008).
"A Guide to MPEG Fundamentals and Protocol Analysis (Including DVB and ATSC)," Tektronix, pp. 1-48, Tektronix, Inc. (1997).
ISO/IEC 13818-1 "Information Technology Generic Coding of Moving Pictures and Associated Audion Information: Systems," Second Edition, Dec. 1, 2000, pp. 174.
ISO/IEC 13818-2 "Information Technology Generic Coding of Moving Pictures and Associated Audion Information: Video," Second Edition, Dec. 15, 2000, pp. 219.
ISO/IEC 13818-2 "Information Technology Generic Coding of Moving Pictures and Associated Audion Information: Audio," Second Edition, Apr. 15, 1998, pp. 126.

\* cited by examiner

METHOD AND APPARATUS FOR PROVIDING LOW RESOLUTION IMAGES IN A BROADCAST SYSTEM

FIELD OF THE INVENTION

The present invention relates to a method and apparatus for providing low resolution information streams to a user in parallel with full resolution information streams to improve channel change response times in broadcast television networks.

BACKGROUND OF THE INVENTION

Multi Service Operators (MSOs) provide television, data, voice and other communications through broadband networks to many users. MSO systems, such as coaxial cable television systems, have been in widespread use for many years and extensive networks have been developed. A typical MSO network generally contains a headend which is usually connected to several nodes which provide content to several nodes, each node connects to media access devices (e.g. cable modems, set top boxes, televisions equipped with set top boxes (or cable cards, including unidirectional and bidirectional), or any other element on a network such as an HFC network) of many subscribers, e.g., a headend receiver may be connected to hundreds of media access devices. In many instances several nodes may serve a particular area of a town or city. The media access devices communicate to the headend via upstream communications on a dedicated band of frequency.

Figure 1:
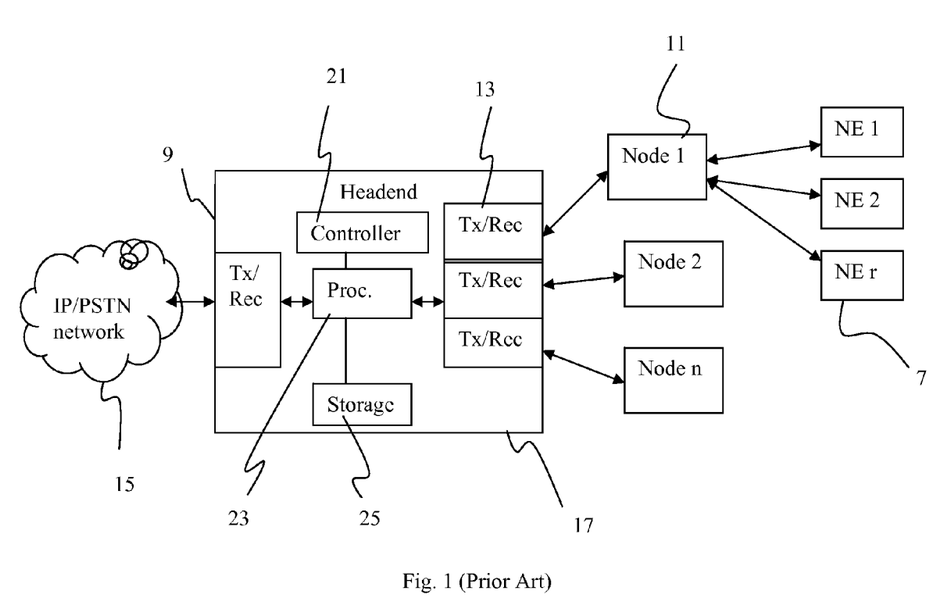
FIG. 1 illustrates an exemplary MSO network.

FIG. 1 illustrates an exemplary MSO network in which a plurality of terminal media access devices 7 are connected to headend 9 through nodes 11 and one or more taps (not shown). In an exemplary arrangement, headend 9 may also contain an optical transceiver which provides optical communications through an optical fiber to the plurality of nodes 11. The headend 9 connects to an IP or PSTN network 15. Those of skill in the art will appreciate that there may be a plurality of nodes 11 connected to the headend, and a headend may contain a plurality of receivers (e.g. 13 receivers) each of which communicate with a plurality (e.g. 100 s) of media access devices 7.

MSOs typically provide electronic guide information to users via the MSO network which indicate the content programming available to users. A typical guide provides a time listing of programs available in a text format, and may provide additional information of a specific program when requested by a user. However, most existing electronic program guides are unappealing, and lack sufficient detail for the user to adequately evaluate a program.

Further, in a typical broadband broadcast system, such as a cable system, channel change performance is often very slow, making channel scrolling or surfing by a user intolerable. A typical broadband broadcast TV system (e.g. a cable system), use MPEG technology in the broadcast format, which includes an MPEG Group of Pictures (GOP), which contains I-frames and B and P frames, all of which makes up the video portion of a program. Channel change performance typically depends on how a video group of pictures (GOP) is created within a program, and more particularly, is often mostly dependent on the frequency of occurrence I-frames and their relation to the B and P frames. When a new channel is requested, an I-frame must be located to allow proper decoding of the channel and synchronization of the program data. When a channel change request is made in an interval between I-frames, the request typically cannot be filled until the next I-frame is received. This process causes a delay in channel change. While the number of I-frames may be increased in a program, the frequency of occurrence of I-frames if often a tradeoff with channel bandwidth. Accordingly, users and MSO operators often complain about channel change response time. Further, as channel changes often occur through interaction with an electronic program guide (EPG) MSOs are often also interested in providing an improved guide with faster channel change times.

One approach provided by Microsoft Corporation uses a switched low resolution stream from a D-Server in the network that is used to display something on the TV as quickly as possible, followed by a switch to the full resolution broadcast channel seconds later. However, this approach is costly and requires two channels to be transmitted for each video channel (one low resolution and one full resolution channel) which are provided as dedicated unicast channels to a given user. The transmission of two channels for each video channel requires significant network resources, including taking up valuable network bandwidth. It should also be noted that this approach is used in Switched Digital video solutions for IPTV and not broadcast cable networks.

Accordingly, what is needed is an improved system and method for mitigating the effects of channel change time delays and provides an appealing and interactive guide experience for the traditional broadcast Cable TV user.

SUMMARY OF THE INVENTION

The present invention provides a low resolution broadcast channel which may be used in a motion image based program guide to improve channel change performance, improve user program guide experience, and to prevent the need to transcode video to be provided to a portable media player.

In accordance with the principles of the invention an apparatus for broadcasting information may comprise: an encoder which is configured to encode information streams to full resolution encoded information streams; a transcoder which is configured to convert the encoded information signals to low resolution encoded information streams having a lower bit rate than the full resolution encoded information streams; a modulator which is configured to modulate the full resolution encoded information streams on a first carrier and modulate the low resolution encoded information streams on a second carrier.

The apparatus may further comprise a combiner unit which combines multiple low resolution encoded information streams into a combined set of low resolution encoded information streams, wherein the modulator may modulate the combined set of low resolution encoded information streams on a single carrier. The combined set of low resolution encoded information streams may contain approximately 100 low resolution encoded information streams. The low resolution information streams may contain a common program clock reference with a full resolution information stream.

In accordance with the principles of the invention, a method of broadcasting information may comprise the steps of: receiving an information stream; encoding the information stream to a full resolution encoded information stream; encoding the information stream to a low resolution information stream having a lower bit rate than the full resolution encoded information stream; modulating the full resolution encoded information streams on a first carrier; and modulating the low resolution encoded information streams on a second carrier.

The method of broadcasting may further comprise the step of: combining multiple low resolution encoded information streams into a combined set of low resolution encoded information streams, wherein the modulator may modulate the combined set of low resolution encoded information streams on a single carrier. In the method of broadcasting, the step of encoding the information stream to a low resolution information stream may include transcoding the full resolution encoded information stream to a low resolution information stream. The low resolution information streams may contain a common program clock reference with a full resolution information stream. The method of broadcasting may further comprise the step of generating a low resolution correlation map which correlates a low resolution stream with a full resolution stream and providing the low resolution map to media access device.

In accordance with the principles of the invention, an apparatus for providing information contained in a plurality of received information streams may comprise: at least one tuner, each tuner configured to receive the information stream from a carrier; a demodulator configured to demodulate the information stream; a decoder configured to decode the information stream, wherein the plurality of received information streams may include full resolution information streams and low resolution information streams having a lower bit rate than the full resolution encoded information streams.

In the apparatus for providing information, a plurality of low resolution information streams may be demodulated from a single carrier. The apparatus for providing information may further comprise a controller which is configured to provide a plurality of low resolution information streams to a display to be simultaneously displayed. The controller may be configured to receive an indication of a user selection of an information stream to be displayed, and to display a low resolution information stream corresponding to the user selection until a full resolution information stream corresponding to the user selection is decoded and available for display. The controller may be configured to transition a display of a low resolution information stream to a display of a full resolution information stream based on a time stamp contained in each of the low resolution information stream and the full resolution stream. The plurality of received information streams may further include a low resolution correlation map which correlates a low resolution stream with a full resolution stream, whereby the controller may switch from a low resolution stream to a full resolution stream without loss of program content presented to the user. The controller may be configured to receive a user selection to provide a selected low resolution information stream to a portable media player, and to provide the selected low resolution information stream to the portable media player without transcoding the low resolution information stream.

In accordance with the principles of the invention, a method of displaying information may comprise the steps of: receiving a plurality of information streams from a carrier, the plurality of received information streams include full resolution information streams and low resolution information streams having a lower bit rate than the full resolution encoded information streams; demodulating a low resolution information stream; decoding the low resolution information stream; and displaying a plurality of low resolution information streams simultaneously.

In the method of displaying information, a plurality of low resolution information streams may be demodulated from a single carrier. The method of displaying information may further comprise the steps of receiving an indication of a user selection of an information stream to be displayed; displaying a low resolution information stream corresponding to the user selection until a full resolution information stream corresponding to the user selection is available for display. The method of displaying information may further include the step of a step of transitioning a display of a low resolution information stream to a display of a full resolution information stream by correlating a low resolution stream with a full resolution stream with a low resolution correlation map, and switching from a low resolution stream to a full resolution stream without loss of program content presented to the user. Transitioning a display of a low resolution information stream to a display of a full resolution information stream may be based on time stamps contained in each of the low resolution information stream and the full resolution stream. The method displaying information may further include the step of receiving a user selection to provide a selected low resolution information stream to a portable media player, and providing the selected low resolution information stream to the portable media player without transcoding the low resolution information stream.

Those of skill in the art will appreciate that a significant benefit of the broadcast of low resolution streams as provided by the invention is that they can then be used to present the initial image on the television screen once a user selects a program to watch. The image may be displayed quickly since its stream is already being decoded for display. Accordingly, the low resolution image may be displayed quickly while the transport stream decoder tunes to the appropriate broadcast carrier that the full resolution image is carried on, demodulates it, and decodes it. Preferably, presenting the low resolution appears nearly instantaneous to a user because it is already being decoded by the STB decoder for the EPG motion image. User perception of channel change times is vastly improved since the channel change may appear to occur immediately via the display of the low resolution stream associated with the channel. After the low resolution image is displayed, the decoder can switch to the identical sequence of the full resolution image which should have similar program clock references for both streams.

The invention solves the channel change delay problem by quickly presenting an image already displayed in the Motion based EPG. This gives the media access device time to provide the normal channel change functions to get to the same location of the full resolution program stream and switch. No additional buffering or references to I frames are needed to provide a very rapid channel change response under the principles of the invention.

DETAILED DESCRIPTION

The invention preferably will mask the perceived channel change time to be much less objectionable to the user by using the broadcast set of low resolution streams as way to quickly display the program content while the main decoder tunes to and then decodes the associated full resolution image. The invention provides for broadcasting low resolution streams to all user media access devices. The decoded low resolution streams may function as a motion image based electronic program guide (EPG). Since they are broadcast to all media access devices, each users EPG experience may be tailored to those channels which are centered around the current channel being viewed, which is explained in detail below with reference to FIG. 7. The decoded low resolution streams may also function as the image provided to a user upon a channel change request and followed by a switch to the full resolution image once the full resolution image is decoded. The low resolution streams may also be provided to a portable media player which may require low resolution images.

In the invention, a set of low resolution streams are broadcast to the user's media access device on a separate broadcast carriers (such as QAM carriers). A number N (e.g. 9) of the low resolution streams are decoded and displayed when a channel is requested, giving the media access device time to tune to the corresponding full resolution video stream's carrier and decode it. Once the full resolution stream is decoded, it is displayed instead of the lower resolution image. Accordingly, both rapid channel changes and a more enjoyable user Electronic Program Guide (EPG) experience is possible. The low resolution stream programs at the media access device include low resolution motion images, which allows a mosaic EPG to be provided to a user instead of or in addition to a text based EPG to improve the user experience.

Figure 2:
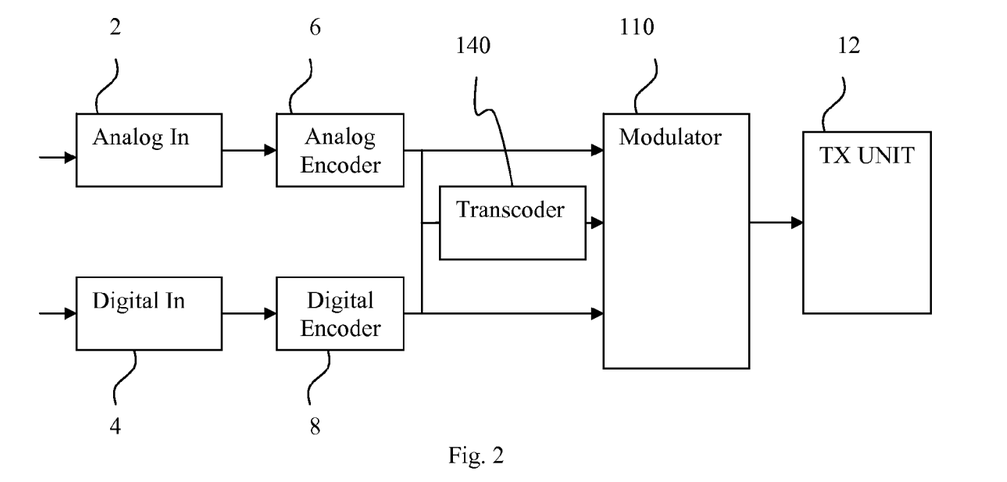
FIG. 2 illustrates an exemplary headend arrangement which may be used in accordance with the principles of the invention.

FIG. 2 illustrates an exemplary headend arrangement which may be used in association with the principles of the invention. As illustrated in FIG. 2 the headend may be configured to receive an analog signal and digital signal via analog input 2 and digital input 4, respectively, from a variety of sources, such as satellite communications. The analog signals may include analog video and audio, as well as control/access information and data. The digital signals may include digital video and audio as well as control/access information and data. The analog signals may be provided to an analog encoder 6, and the digital signals may be provided digital encoder 8 where they are encoded into a suitable format. The encoded digital and analog signals are provided to a modulator 110, such as a QAM modulator, in which a modulation scheme, such as (e.g. 256 QAM modulation) is applied. The modulated signals are transmitted, via a transmission unit 12, downstream from the headend throughout the MSO network. Those of skill in the art will appreciate that the transmission may be an optical transmission via a modulated laser over an optical fiber or a transmission over a coaxial cable.

As further illustrated in FIG. 2, the encoded analog and digital signals are preferably provided to a transcoder 140. Transcoder 140 preferably transcodes the signals into a lower resolution format, such as 200-400 Kb/s video streams, compared a full resolution stream which may typically contain 38.88 Mb/s. Those of skill in the art will appreciate that various techniques for transcoding maybe used, such as decoding and re-encoding into the lower resolution format, and/or dropping several types of information bits in the data.

A plurality of analog/digital streams may be simultaneously transcoded to provide a low resolution stream for each, e. g. a low resolution stream may include about 300 kb/s/channel. More particularly, the resulting low resolution transcoded streams from transcoder 140 may include an aggregation of low resolution streams, including low resolution video, from a number of full resolution channels, and placed on a single broadcast carrier stream which is transmitted to the users. Those of skill in the art will appreciate that the multiple low resolution streams may be aggregated (e.g. multiplexed) into one stream which is modulated via QAM modulation by a variety of techniques. The number of low resolution transcoded streams which are aggregated may be based on the bit rate of the transcoded stream and the bit rate of a normal stream, a non-transcoded stream. More particularly, the aggregated transcoded stream may include a sufficient number of low resolution streams which have a combined bandwidth or bit rate which approximates the available bandwidth or bit rate of a non-transcoded broadcast carrier stream (i.e. a full resolution stream).

Figure 3:
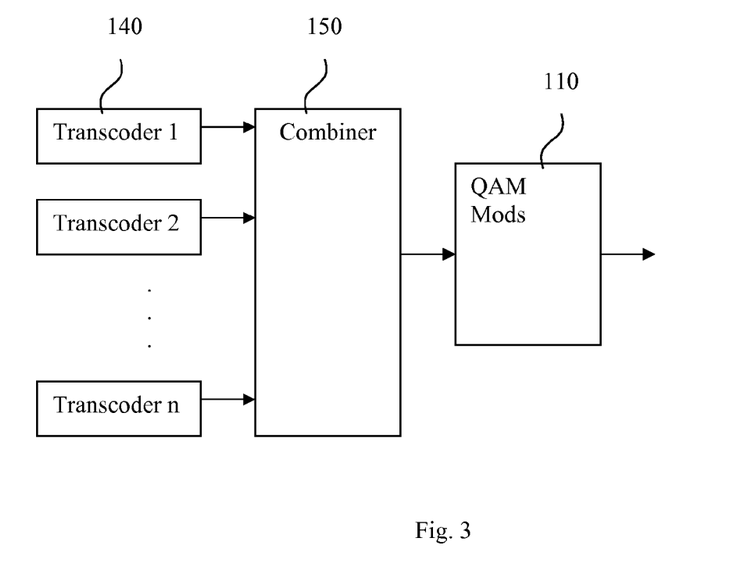
FIG. 3 illustrates an exemplary approach for providing aggregated transcoded streams in accordance with the principles of the invention.

The streams (channels) which are aggregated in a transcoded stream may be sequential streams in terms of having sequential frequencies. FIG. 3 illustrates an exemplary approach for providing aggregated transcoded streams. As illustrated in FIG. 3, a plurality of transcoder units 140 provide a transcoded stream to a combiner unit 150, which may include a variety of techniques, including multiplexing, and may include time division or frequency division techniques. A single broadcast carrier stream may be used for the broadcast of hundreds of low resolution transcoded streams, e.g. roughly 100 200-400 Kb/s low resolution transcoded streams may be transmitted in a single 6 MHz 38.88 Mb/s broadcast carrier stream.

Figure 4:
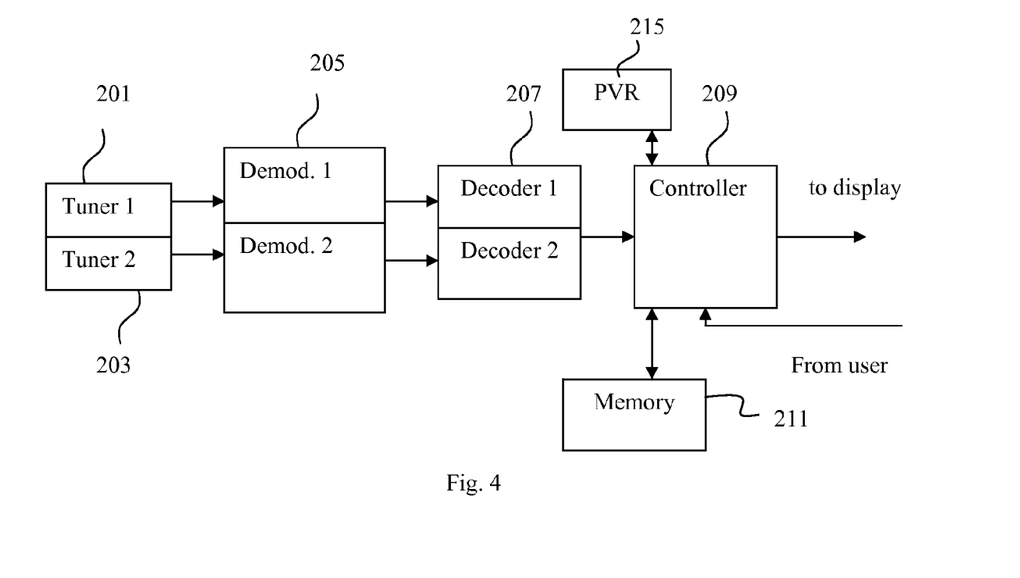
FIG. 4 illustrates an exemplary user device which may be used to receive and display the low resolution streams in accordance with the principles of the invention.

FIG. 4 illustrates an exemplary user device, such as a media access device, which may be a set top box, which may be used to receive and display the low resolution streams. As illustrated in FIG. 4, tuners 1 and 2 may be configured to tune to two different frequencies to receive broadcast channels (e.g. QAM channels) or streams associated with the tuned frequency. A demodulator 205 (e.g. QAM demodulator) demodulates the tuned channels and provides the streams to decoder 207, which decodes the information contained in the streams, e.g. video, audio, control/access information and other data, including clock data associated with the streams and programs. The decoded information is provided to a display (not shown) such as a television display via a controller 209 based on user input.

The user input may be from buttons on the media access device, from a remote control through an IR or RF interface, or another remote device, e.g. portable media player. The user may type in the channel number on the remote to select a particular displayed low resolution stream. Preferably, the channel number of a displayed low resolution stream is displayed in a visibly overlayed manner with the low resolution stream. A user may also select a particular displayed channel by first selecting the displayed set of channels, which may display individual channels of the set of channels to the user at a time by highlighting one of the channels or by displaying only one channel on the display, and further selecting a highlighted or singularly displayed low resolution stream. Preferably, the user can scroll through the set of low resolution streams with arrow buttons on the remote, which highlights or displays individual channels in a manner associated with the scrolling operation. Alternatively, a cursor may be presented on the display which is associated with movement of the remote control. The user may move the cursor over a particular low resolution stream to select that channel for viewing or select more guide information associated with the channel. Those of skill in the art will appreciate that the guide information may include additional information of the program, such as the actors, plot, duration, year of creation and other information. The guide information may be provided with the low resolution stream or may be previously stored in memory 211 and associated with the low resolution stream by controller 209.

The guide information with the low resolution streams may also be provided in a sequential list format from the broadcast carrier, with the low resolution image for a particular channel displayed visibly adjacent to the guide information. A user may then scroll through the several low resolution images and with their associated guide information displayed.

Additional data, such as a channel map including a low resolution correlation map or table, may be provided from a headend which indicates the correspondence between the low resolution streams and their associated full resolution streams. The identification of the carriers, e.g. QAM carries, may also be indicated. For example, channel 8 from the low resolution stream may be matched to channel 8 of a full resolution stream, by QAM #x, program stream ID yy. A mapping table may be preferably pushed to the media access device and stored locally, such as in memory 211 of FIG. 4. The controller may use the low resolution correlation table to correlate the low resolution stream with a full resolution stream and correlate time stamp information contained in both streams to allow a near seamless switch between the two in content. More particularly, the controller may receive program clock information associated with the low resolution stream its corresponding full resolution stream, the clock information in each may include time stamps in the content which controller 209 may align when switching from one stream to another. Once the timestamps in the low resolution and full resolution streams are aligned, the controller may switch the displayed stream at the next available I-Frame in the content, e.g. of the full resolution stream, thereby making the switch in display seamless in content presentation such that portions of program content are not lost in presentation to the user.

Figure 5:
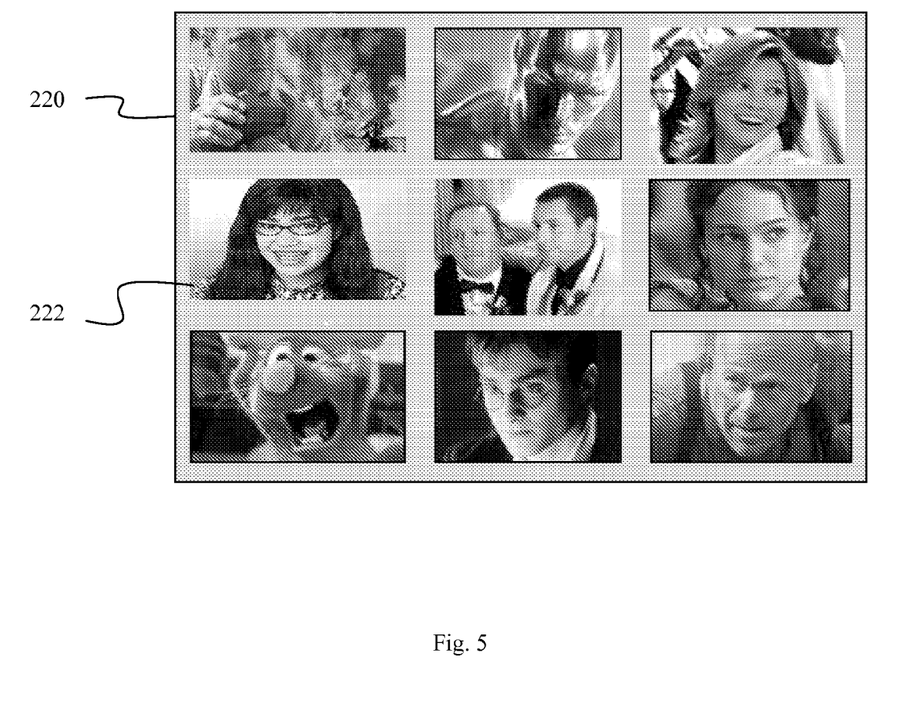
FIG. 5 illustrates an exemplary mosaic motion image based electronic guide display in accordance with the principles of the invention.

FIG. 5 illustrates an exemplary mosaic motion image based electronic guide display in accordance with the principles of the invention. As illustrated in FIG. 5, the low resolution streams can be used to populate a mosaic motion image based electronic program guide (EPG) where the user sees a motion image of which programs are currently playing in a given time slot. The mosaic guide layout with multiple low resolution streams gives the user an instant recollection of the program, the actors, etc. that a user may visually recollect, rather than requiring a user to access the textual information on a grid based guide. The invention also provides a more informative and impressive user experience.

As illustrated in FIG. 5, a number N of the low resolution streams may be decoded to be displayed together in a mosaic. While nine low resolution streams are illustrated in FIG. 5, any suitable number may be used. Those of skill in the art will appreciate that N low resolution streams may be sequentially decoded by a high processing speed decoder and presented to controller for display. A buffering technique may be used if the decoder processing speed is insufficient to provide the N decoded streams for display during the display period. Alternatively, N decoders may be used with a multiplexer to provide the combined decoded stream to the controller for display.

Associated audio streams of the low resolution streams, such as the mosaic display or a singular low resolution channel display, may be deactivated by muting all of the low resolution video audio streams, by not decoding the audio streams, and/or by switching the audio streams so they are not provided to speakers associated with the display. While the low resolution streams are displayed, another audio stream may be provided to user, such as audio from one of the hightlighted low resolution images from the EPG, a full resolution stream, a dedicated audio channel, or a pre-stored audio track.

Figure 6:
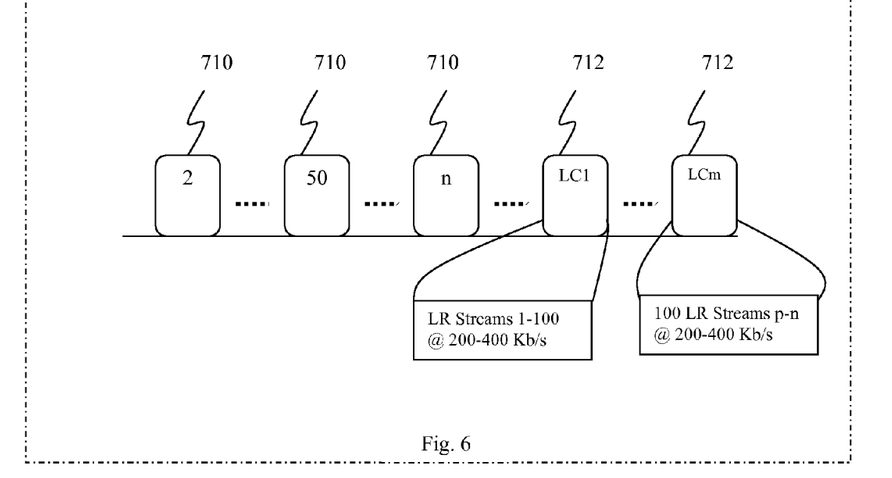
FIG. 6 illustrates a graphical representation of channels using the principles of the invention.

FIG. 6 illustrates a graphical representation of channels using the principles of the invention. In FIG. 6, full resolution streams are illustrated as contained in carrier blocks 710 and low resolution streams are illustrated as contained in frequency carrier blocks 712, both carrier blocks 710 and 712 represent broadcast carrier frequencies which are generally associated with a particular television channel. Those of skill in the art will appreciate that carrier blocks 710 contain information for only one television channel, e.g. full resolution video, audio, and control and information data for the channel. Carrier blocks 712 contain a plurality of low resolution streams (e.g., low resolution video, audio and control and information for approximately 100 low resolution streams (e.g. 200-400 Kb/s)).

Figure 7:
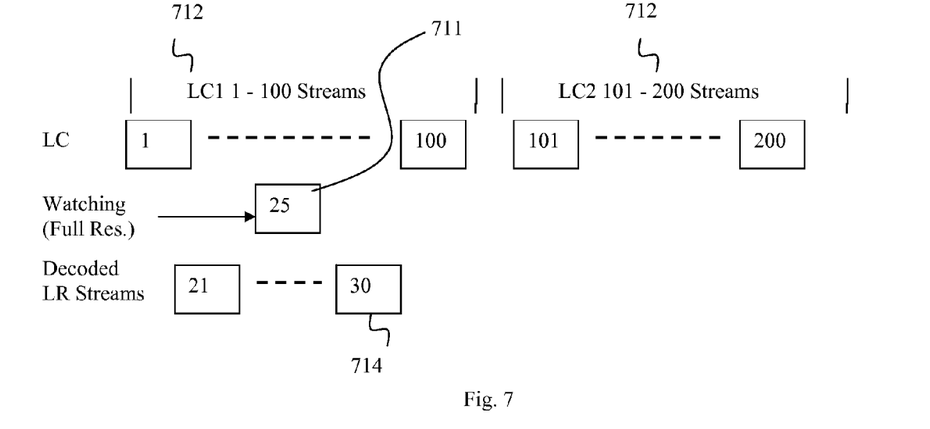
FIG. 7 illustrates a graphical representation of low resolution channel selection for display in a mosaic guide.

FIG. 7 illustrates a graphical representation of using the low resolution channels in a mosaic EPG. In one implementation, a user who is viewing a full resolution stream, e.g. television channel 25 is tuned, demodulated and decoded, and desires a channel change, may request the mosaic guide, such as by pressing a dedicated button on a remote control. A low resolution carrier 712, which may contain a large number of low resolution streams (e.g. 100 low resolution streams), may be tuned by a second tuner. A subset of the low resolution streams 714 (e.g. 9 low resolution streams) in carrier 172 may be simultaneously demodulated and decoded by a second demodulator and second decoder, and displayed in a mosaic guide format, such as illustrated in FIG. 5. The displayed mosaic display may include low resolution streams 714 associated with television channels centered around the currently viewed full resolution stream 711, e.g., low resolution streams of channels 21 through 30. The currently viewed television program (e.g. channel 25) may continued to be tuned, demodulated and decoded by the first tuner, first demodulator and first decoder until the selection of the new full resolution channel is received from the user. The mosaic may be displayed by itself or with the full resolution stream of the currently viewed television program by displaying the full resolution stream of the currently view program in a reduced scaled version, such as in picture-in-picture (PIP) simultaneously while the mosaic is displayed. The audio of the full resolution stream, e.g., channel 25 may also continue to be provided to the user during the mosaic display. The user may display the next adjacent block (e.g. nine) of low resolution streams, e.g. low resolution streams associated with television channels 31-40, by providing an up or down scroll input, such as through a remote control or through buttons on a set top box. The corresponding adjacent subset (e.g. nine) low resolution streams are provided to the second demodulator and second decoder for display. Alternatively any block of low resolution streams may be displayed upon requesting the mosaic guide, such as ones associated with television channels 1-9, rather than the low resolution streams centered around the currently viewed full resolution channel.

In the example, the user preferably selects a television channel by selecting a low resolution displayed stream in the mosaic, e.g. selecting the low resolution stream associated with channel 8. Upon selection, the low resolution stream associated with channel 8 is preferably displayed by itself, i.e., the mosaic is removed and low resolution channel 8 is scaled to a full display image, or may be displayed in less than a full screen image with additional program guide information displayed. In this manner, the content of television channel 8 is provided to the user instead of channel 25 without a channel change delay, and may appear as an instant channel change. The selection of the television channel, e.g. to channel 8, also causes the first tuner currently tuned to the carrier providing channel 25 to tune to the carrier providing channel 8, which is provided to first demodulator and first decoder once it is received by the first tuner.

Figure 8:
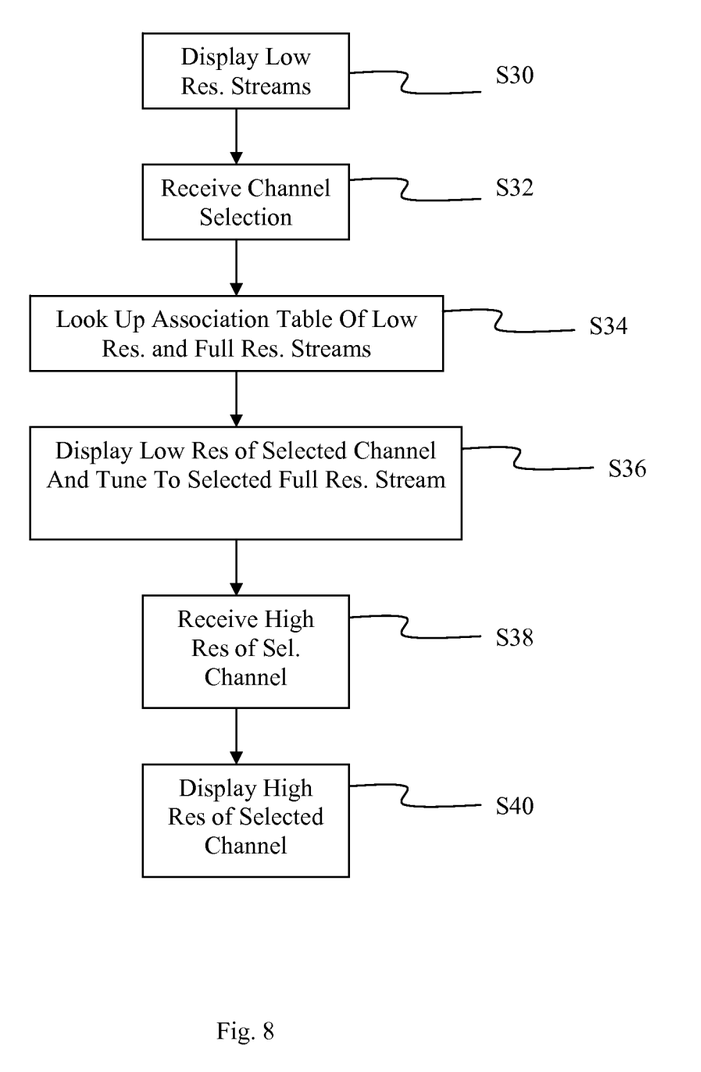
FIG. 8 illustrates an exemplary process for changing a channel based on a selection of a low resolution stream in accordance with the principles of the invention.

FIG. 8 illustrates an exemplary process for changing a channel based on a selection of a low resolution stream. As illustrated in FIG. 8, a guide is displayed (step S30) which preferably displays multiple low resolution streams in a mosaic, such as illustrated in FIG. 5, and a channel selection is received (step S32). Controller 209 accesses a channel association map or table, which may be stored in memory 211 and which provides a correlation between the selected displayed low resolution stream and the channel carrier frequency of the corresponding full resolution stream (step S34). Controller 209 instructs tuner 1 or tuner 2, whichever is not tuned to the low resolution broadcast carrier channel (step S34), to tune to the carrier frequency of the corresponding full resolution stream. In a preferred implementation, the full resolution stream is tuned/received and decoded while the associated low resolution stream is being displayed. The process of tuning to the selected channel, demodulating and decoding the selected channel creates a delay in which the selected channel in not provided to the user. However, in the invention, the content of the full resolution stream is provided to the display using the low resolution stream in the low resolution broadcast carrier channel during this time (step S36), providing immediate access to the content to the user. The low resolution stream may also be scaled to best match image quality and TV requirements. The low resolution stream may be displayed as a full screen image or as a partial screen image with additional guide information (e.g., title, start/stop times, duration, actors, story line, etc.) simultaneously displayed and/or with advertising displayed.

The selection of the full resolution stream also may activate an audio stream of the low resolution stream to be provided for consumption by the user while viewing the low resolution video. The audio stream may be activated by being un-muted, by being switched to speakers, and/or by being decoded.

Once the full resolution stream is received and ready for display, e.g., the full resolution stream is decoded and appropriately scaled for the TV format, it is provided to the display (step S38 and S40). The full resolution stream may replace the displayed low resolution stream via a sudden or hard switch on the display. Alternatively, the full resolution stream may fade-in the display of the low resolution stream to make the transition less abrupt to the user. Other techniques may be used as well, such as a slide-in technique. Those of skill in the art will appreciate that any number of image transitioning techniques may be used.

In an alternate embodiment, in the absence of a multi tuner system on the user device, the low resolution stream may be streamed in an advanced time with respect to the full resolution streams. The low resolution streams may be buffered, such as in a personal video recorder (PVR) 215 (shown in FIG. 4), for a period of time which may be based on an expected amount of time of the delay to display the selected channel. The buffered low resolution stream stored in the PVR 215 may be displayed during the channel change delay time. Alternatively, a fixed (stationary image) from the low resolution stream may be displayed during the period to provide the full resolution stream in absence of a PVR used for buffering an advanced low resolution stream.

In an alternate embodiment, controller 209 may request a selected channel from the displayed low resolution streams by requesting the channel from a network element, such as a headend or edge QAM. Such arrangement may be used in a switched digital video system or in an on demand system. In this embodiment, the low resolution stream of the selected channel would preferably still be displayed during the delay in retrieving the full resolution stream.

Further, when a user uses the channel up or down button on the remote control, the STB associates the selected channel with its corresponding low resolution stream while the full resolution stream is tuned, demodulated and decoded. The low resolution stream is preferably displayed during this period. The audio stream of a selected low resolution stream which is selected is provided to the user, e.g. activated to be provided to speakers for consumption by a user. The controller may determine the desired full resolution channel identity by associating the channel as one surrounding a currently displayed channel. As a user progressively tunes up or down the full channel lineup, the controller can shift (up or down) the N decoded low resolution streams. Those of skill in the art will appreciate that the controller may keep track of what channel is currently being displayed as channel up or down selections are received from the remote. The channels that are decoded from the low resolution video broadcast carrier may also be tracked accordingly. The same configuration (mosaic EPG and rapid up and down channel change) may be applied to a users favorite channel line up. The favorites may be contained in the same low resolution carrier channel, e.g. within the same 100 channels in the low resolution video stream carried on a single broadcast carrier, e.g. a single QAM carrier.

Those of skill in the art will appreciate that the invention may be used without a motion based mosiac EPG. The second tuner can be dedicated to decoding some number of channels above or below the currently viewed channel and used as described above to display the newly requested channel momentarily, until the full resolution stream is tuned to and decoded. Like above, the controller may keep track of what channel is currently being displayed and as channel up or down selections are received from the remote, the channels that are decoded from the low resolution video broadcast carrier may also be tracked accordingly.

Figure 9:
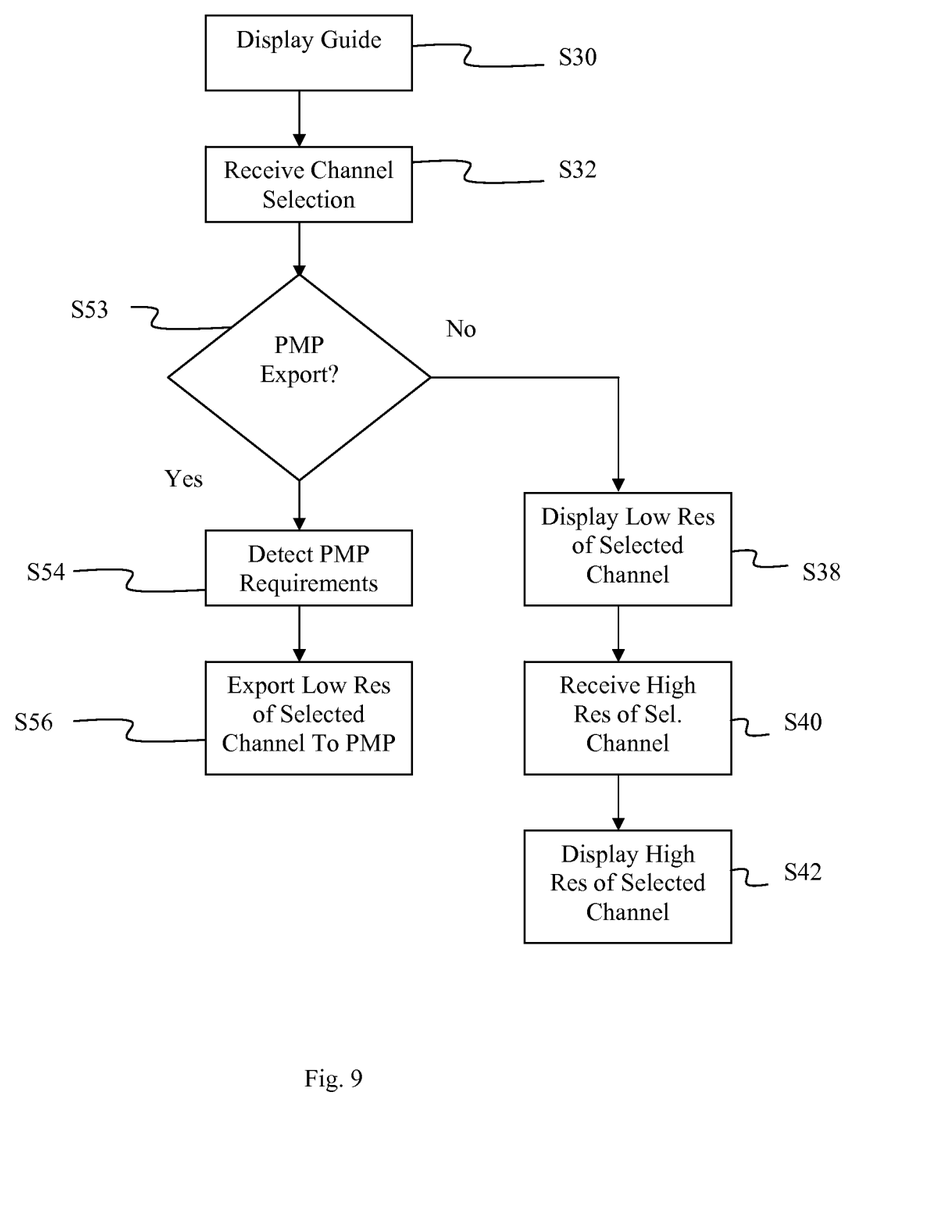
FIG. 9 illustrates an exemplary process for exporting a low resolution program from a user's set top box or media access device to a portable device in accordance with the principles of the invention.

FIG. 9 illustrates an exemplary process for exporting a low resolution program from a user's set top box or media access device to a portable device. As illustrated in FIG. 9, the process may start with a display of the visual guide information (step S30) and a channel may be selected by the user (step S52). After the channel selection, the user may be prompted to export the selected program to a portable media player (PMP) (step S53). If the user selects to export the program (step S53, YES), the media access device preferably detects the PMP requirements, step S54, using known techniques, such as UPNP or other communication protocols. The low resolution program version is provided to the PMP, step S56. Those of skill in the art will appreciate that the low resolution program may be stored on the media access device, such as PVR 215, prior to transfer and that the PMP requirements may include formatting requirements as well as communication requirements.

If the user selects not to export the selected program to a PMP, step S53, NO, the low resolution version of the program is provided to a user display while the full resolution version is retrieved, step S38. Once the full resolution version is retrieved (step S40), the full resolution version is displayed (step S42) as discussed above.

The process illustrated in FIG. 9, allows a user to provide a version of a program to a PMP in a resolution which matches the display resolution of the PMP. Many PMP's require a low resolution version of programs for display, often requiring a full resolution to be transcoded on a set top box to a lower resolution. The need for transcoding may be eliminated by giving the user the option to export the low resolution version directly to the PMP. The low resolution stream may be pushed to the PMP in real time broadcast from the headend, hence the transfer speed may occur more quickly.

Further, the selected program may be exported to the PMP via a hard wired connection, such as a USB or HDMI cable from the media access device, or may be exported via a direct wireless connection to the PMP, such as a Bluetooth, 802.11x, Firewire, or UWB connections. An indirect connection may also be used for the transport using intermediate devices which may include a combination of hardwire and wireless connections, including femto cells, cellular networks (e.g. 3G, 4G, CDMA etc.) and Ethernet. Moreover, the user prompts associated with FIG. 8, may be displayed on the PMP and the input from the user may be provided via the PMP to initiate the export of the program.

The processes in either and/or both FIG. 8 or 9 may be implemented in hard wired devices, firmware or software running in a processor. A processing unit for a software or firmware implementation is preferably contained in a media access device. Any of the processes illustrated in either and/or both FIG. 8 or 9 may be contained on a computer readable medium which may be read by controller 209. A computer readable medium may be any medium capable of carrying instructions to be performed by a microprocessor, including a CD disc, DVD disc, magnetic or optical disc, tape, silicon based removable or non-removable memory, or any other media capable of carrying instructions.

Those of skill in the art will appreciate that a significant benefit of the broadcast of low resolution streams as provided by the invention is that they can then be used to present the initial image on the television screen once a user selects a program to watch. The image may be displayed quickly while the transport stream decoder tunes to the appropriate QAM tuner that the full resolution image is carried on, demodulate it, and decode it. Preferably, presenting the low resolution appears nearly instantaneous to a user because it is already being decoded by the media access device decoder for the EPG motion image. User perception of channel change time is vastly improved since the channel change may appear to occur immediately via the display of the low resolution stream associated with the channel. After the low resolution image is displayed, the decoder can switch to the identical sequence of the full resolution image which should have similar program clock references for both streams.

The invention solves the channel change delay problem in cable systems by quickly presenting an image already displayed in the Motion based EPG or simply decoded in parallel from the low resolution images carried in the above mentioned QAM carriers. This gives the media access device time to provide the normal channel change functions to get to the same location of the full resolution program stream and switch. No additional buffering or references to I frames are needed to provide a very rapid channel change response under the principles of the invention.

What is claimed is:

1. An apparatus for broadcasting information from a headend or hub, the apparatus comprising:
    an encoder which is configured to encode information streams to a plurality of full resolution encoded information streams;
    a modulator configured to modulate the plurality of full resolution encoded information streams for transmission over a plurality of broadcast carriers;
    a transcoder for transcoding the plurality of full resolution encoded information streams to a plurality of low resolution encoded information streams, such that each low resolution encoded information stream corresponds to a respective one of the plurality of full resolution encoded information streams, each low resolution stream having a lower bit rate than the corresponding full resolution encoded information stream,
    wherein the transmission of each low resolution stream is time aligned with the transmission of the corresponding full resolution encoded information stream;
    a combiner unit configured to aggregate the plurality of low resolution encoded information streams corresponding to the full resolution encoded information streams for modulating onto a single carrier;
    the modulator further configured to modulate the aggregated set of low resolution encoded information streams on the single carrier;
    a transmission unit for transmitting the modulated streams downstream from the headend or hub,
    wherein the full resolution encoded information streams are transmitted via the plurality of broadcast carriers and at least one full resolution encoded information stream is receivable by a first tuner at a user device for demodulating by a first demodulator and decoding by a first decoder, and
    wherein the aggregated low resolution encoded information streams that correspond to the full resolution encoded information streams are transmitted, in parallel to transmissions over the plurality of broadcast carriers, via the single carrier, the low resolution encoded information streams receivable by a second tuner at the user device for demodulating by a second demodulator and decoding by a second decoder, such that each of the aggregated low resolution encoded information streams are decoded in parallel to the at least one full resolution encoded information stream and is readily available for display,
    wherein the single carrier carrying the aggregated set of low resolution encoded information streams is distinct from a plurality of carriers carrying the corresponding full resolution encoded information streams.

2. The apparatus of claim 1, wherein the combined set of low resolution encoded information streams aggregated by the combiner unit contains approximately 100 low resolution encoded information streams.

3. The apparatus of claim 1, wherein a low resolution encoded information stream contains a common program clock reference with an encoded full resolution information stream.

4. A method of broadcasting information comprising:
    receiving information streams;
    encoding the information streams to a plurality of full resolution encoded information streams;
    modulating the plurality of full resolution encoded information streams for transmission over a plurality of broadcast carriers such that at least one full resolution encoded information stream is receivable by a first tuner at a user device for demodulating by a first demodulator and decoding by a first decoder;

transcoding the information streams to a plurality of low resolution information stream, such that each low resolution encoded information stream corresponds to a respective one of the plurality of full resolution encoded information streams, each low resolution stream having a lower bit rate than the corresponding full resolution encoded information stream, wherein the transmission of each low resolution stream is time aligned with the transmission of the corresponding full resolution encoded information stream;

aggregating the plurality of low resolution encoded information streams corresponding to the full resolution encoded information streams for modulating onto a single carrier;

modulating the aggregated set of low resolution encoded information streams onto the single carrier;

transmitting the modulated streams downstream from a headend, wherein the full resolution encoded information streams are transmitted via the plurality of broadcast carriers;

in parallel to transmissions over the plurality of broadcast carriers, transmitting the aggregated low resolution encoded information streams that correspond to the full resolution encoded information streams via the single carrier, the low resolution encoded information streams receivable by a second tuner at the user device for demodulating by a second demodulator and decoding by a second decoder, such that each of the aggregated low resolution encoded information streams are decoded in parallel to the at least one full resolution encoded information stream and is readily available for display, wherein the single carrier carrying the aggregated set of low resolution encoded information streams is distinct from the plurality of broadcast carriers carrying the corresponding full resolution encoded information streams.

5. The method of claim 4, wherein the aggregated low resolution encoded information streams contains approximately 100 low resolution encoded information streams.

6. The method of claim 4, wherein transcoding the information streams includes transcoding a full resolution encoded information stream to a low resolution information stream.

7. The method of claim 4, wherein a low resolution encoded information stream contains a common program clock reference with an encoded full resolution information stream.

8. The method of claim 4, further comprising generating a low resolution correlation map which correlates a low resolution stream with a full resolution stream and providing the low resolution map to media access device.

9. An apparatus for providing information contained in a plurality of received information streams, comprising:

a plurality of tuners configured to receive information streams, wherein at least a first one of the plurality of tuners is configured to receive at least one of a plurality of full resolution information streams transmitted over a plurality of broadcast carriers, wherein at least a second one of the plurality of tuners is configured to receive an aggregated plurality of low resolution information streams transmitted over a single carrier, each of the low resolution encoded information stream corresponding to a respective one of a plurality of full resolution encoded information streams transmitted over the plurality of broadcast carriers, and a transmission of each low resolution stream is time aligned with the transmission of the corresponding full resolution encoded information stream, wherein the low resolution information streams are received in parallel to a receipt by the at least first one of the plurality of tuners of the at least one of the plurality of full resolution information streams;

a demodulator configured to demodulate received information streams, the low resolution information streams each having a lower bit rate than the corresponding full resolution encoded information stream, wherein the plurality of low resolution information streams are received on a single carrier distinct from the plurality of broadcast carriers carrying the full resolution information streams; and a controller configured, in response to the apparatus receiving a request for information from a channel of the at least a subset of channels, to provide a low resolution stream from the plurality of low resolution information streams from the single carrier for display, wherein the controller provides the low resolution streams for display until the full resolution stream is tuned to, decoded, and available to replace the display of the low resolution stream.

10. The apparatus of claim 9, wherein the controller is configured to provide the plurality of low resolution information streams to a display unit to be simultaneously displayed.

11. The apparatus of claim 10, wherein the controller is configured to receive an indication of a user selection of an information stream to be displayed, and to display a low resolution information stream corresponding to the user selection until a full resolution information stream corresponding to the user selection is available for display.

12. The apparatus of claim 11, wherein the controller is configured to receive the user selection to provide a selected low resolution information stream to a portable media player, and to provide the selected low resolution information stream to the portable media player without transcoding the low resolution information stream.

13. The apparatus of claim 10, wherein the plurality of received information streams further include a low resolution correlation map which correlates a low resolution stream with a full resolution stream, whereby the controller switches from a low resolution stream to a full resolution stream without loss of program content presented to a user.

14. The apparatus of claim 13, wherein the controller is configured to transition a display of a low resolution information stream to a display of a full resolution information stream based on a time stamp contained in each of the low resolution information stream and the full resolution stream.

15. A method of displaying information comprising:

receiving at a first tuner at least one of a plurality of full resolution information streams transmitted over a plurality of broadcast carriers;

in parallel to a receipt of the at least one of the plurality of full resolution information streams transmitted over the plurality of broadcast carriers, receiving at a second tuner over a single carrier a plurality of low resolution information streams each corresponding to a respective one of the plurality of full resolution encoded information streams transmitted over the plurality of broadcast carriers, a transmission of each low resolution stream time aligned with the transmission of the corresponding full resolution encoded information stream, and the plurality of low resolution information streams having a lower bit rate than the full resolution encoded information streams, demodulating the plurality of low resolution information streams from the single carrier;

receiving a request for information from a channel of at least a subset of channels;

decoding at least one low resolution information stream from the plurality of low resolution information streams corresponding to the request;

displaying the at least one low resolution information stream simultaneously; and decoding at least one full resolution encoded information stream corresponding to both the request and the displayed at least one low resolution information stream, wherein a controller provides the low resolution streams for display until the full resolution stream is tuned to, decoded, and available to replace the displayed at least one low resolution information stream.

16. The method of claim 15, further comprising:

receiving an indication of a user selection of an information stream to be displayed;

displaying a low resolution information stream corresponding to the user selection until a full resolution information stream corresponding to the user selection is available for display.

17. The method of claim 16, further including transitioning a display of a low resolution information stream to a display of a full resolution information stream by correlating a low resolution stream with a full resolution stream with a low resolution correlation map, and switching from a low resolution stream to a full resolution stream without loss of program content presented to a user.

18. The method of claim 17, further including transitioning a display of a low resolution information stream to a display of a full resolution information stream based on time stamps contained in each of the low resolution information stream and the full resolution stream.

19. The method of claim 16, further including receiving the user selection to provide a selected low resolution information stream to a portable media player, and providing the selected low resolution information stream to the portable media player without transcoding the low resolution information stream.

* * * * *